(12) United States Patent
Weber et al.

(10) Patent No.: US 7,707,198 B2
(45) Date of Patent: Apr. 27, 2010

(54) HARVESTING OF MEDIA OBJECTS FROM SEARCHED SITES WITHOUT A USER HAVING TO ENTER THE SITES

(75) Inventors: Karon A. Weber, San Francisco, CA (US); Samantha M. Tripodi, San Francisco, CA (US); David Ayman Shamma, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 692 days.

(21) Appl. No.: 11/609,884

(22) Filed: Dec. 12, 2006

(65) Prior Publication Data

US 2008/0140712 A1 Jun. 12, 2008

(51) Int. Cl.
*G06F 17/30* (2006.01)

(52) U.S. Cl. .................. 707/705; 707/706; 707/709; 707/710

(58) Field of Classification Search .................. 707/10, 707/1, 3, 705, 706, 709, 710
See application file for complete search history.

(56) References Cited

U.S. PATENT DOCUMENTS

| | | | |
|---|---|---|---|
| 5,893,110 A | | 4/1999 | Weber et al. |
| 6,920,448 B2 * | | 7/2005 | Kincaid et al. ............ 707/3 |
| 6,983,287 B1 * | | 1/2006 | Jayanti et al. ............ 707/102 |
| 7,082,192 B2 * | | 7/2006 | Weaver ............... 379/211.02 |
| 7,162,493 B2 * | | 1/2007 | Weiss et al. ............ 707/104.1 |
| 7,194,442 B1 * | | 3/2007 | Flanagan et al. ............ 705/80 |
| 7,225,407 B2 * | | 5/2007 | Sommerer et al. ............ 715/738 |
| 7,308,464 B2 * | | 12/2007 | Nowitz et al. ............ 707/104.1 |
| 7,426,687 B1 * | | 9/2008 | Schultz et al. ............ 715/208 |
| 7,480,910 B1 * | | 1/2009 | Kuwamoto et al. ............ 718/102 |
| 7,519,605 B2 * | | 4/2009 | Vailaya et al. ............ 707/100 |
| 7,565,345 B2 * | | 7/2009 | Bailey et al. ............ 707/3 |
| 2002/0087573 A1 * | | 7/2002 | Reuning et al. ............ 707/102 |

OTHER PUBLICATIONS

Lieberman, Henry, "Letizia: An Agent That Assists Web Browsing" (Abstract) Massachusetts Institute of Technology, Cambridge, MA, Aug. 1995, http://web.media.mit.edu/~lieber/Lieberary/Letizia/Letizia-Intro.html.

(Continued)

*Primary Examiner*—Jean M Corrielus
(74) *Attorney, Agent, or Firm*—Darby & Darby P.C.; Scott M. Tobias

(57) ABSTRACT

A method and apparatus for enabling a user to access media objects, such as images, from a website without requiring the user to enter the website. In one embodiment, a search engine searches for websites that match a submitted search term. A selected URL to one of the resulting websites is submitted to a harvester that accesses a web page of the selected website and identifies a media object of the web page. The harvester determines the characteristic(s) of the media object, such as a dimension, an aspect ratio, a proximity to other media objects, etc. The harvester determines a second media object with substantially the same characteristic(s). The determined media objects, or subportions, are rendered in a client user interface. Relationships are mapped between a selected media object and projects that use the object. Manipulating a rendered portion causes a related operation on the whole media object.

20 Claims, 6 Drawing Sheets

OTHER PUBLICATIONS

Lieberman Henry, "Letizia: An Agent That Assists Web Browsing" Media Laboratory, Massachusetts Institute of Technology, Cambridge, MA, USA, Aug. 1995.

Lieberman, Henry, "Autonomous Interface Agents," Media Laboratory, Proceedings of the ACM Conference on Computers and Human Interface, CHI-97, Atlanta, GA, Mar. 1997.

Lieberman, Henry et al., "Exploring the Web with Reconnaissance Agents;" Communication of the ACM, Aug. 2001, pp. 69-75.

Lieberman, Henry et al., "Let's Browse: A Collaborative Web Browsing Agent," MIT Media Lab, Cambridge, MA.

* cited by examiner

The Team began with the conservation of the St. Peregrine Chapel, the small side chapel located on the southeast side of the Serra Chapel. Since then, the St. Peregrine Chapel has been re-roofed, the eroded adobe bricks have been replaced, and the building exterior has been re-plastered.

404

The Team will apply a pigmented limewash in the coming weeks, formulated to match the east wall of the Serra Chapel.

The Team hired a professional pest control company to treat the Mission for termites in late December. Two parts of this treatment effort were implemented, including carrying out a non-invasive "in-ground" treatment for subterranean termites. The second part was more labor intensive, with the Team tenting and fumigating the Gift Shop, South Wing, Serra Chapel, Rectory, Kindergarten classrooms, and Mission Administrative Building. It was determined that prior to carrying out the wood treatment within the Chapel, it would be best to fumigate for termites, ensuring that they did not continue their damage to new preservation work.

410

408

Same corner of ceiling, after restoration

402

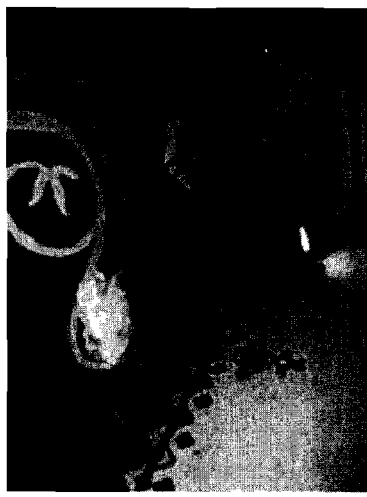
406

East Hall, Southwest Corner
Ceiling before Restoration

© 1997-2006 CMSA

HARVESTING OF MEDIA OBJECTS FROM SEARCHED SITES WITHOUT A USER HAVING TO ENTER THE SITES

FIELD OF ART

The present invention relates generally to computing software for managing media objects, and more particularly to a method and system directed to searching for, collecting, previewing, and enabling a user to obtain media objects.

BACKGROUND

Internet users often use search engines to search for content based on keywords submitted to the search engine. The search engines generally return a list of web pages that include at least one of the submitted keywords or are somehow related to the submitted keywords. The search engines also typically return a snippet of the content text that includes, or is near the submitted keywords. To obtain further content from a resulting web page, a user generally selects a uniform resource locator (URL) link associated with the listed web page. The web page content is then retrieved and displayed in the user's browser.

Some search services, such as the Ben Franklin search service provided by Vivisimo, Inc., include a preview button next to each listed search result. Selecting the preview button causes a pane to appear below the listed search result. The pane displays the web page of that listed search result. The user can scroll through the web page within the pane. The web page is displayed within the list of search results, so that the user can still see the other listed search results.

Users can also search for images, videos, and audio content with keywords. For example, when searching for images, search engines usually return a list of thumbnail images. Each thumbnail image is accompanied by a URL that the user can select to access the full image and/or a web page that contains the image. One technique for determining a relevant image in a web page is to detect an image file that is surrounded by, or partially embedded within text that includes one or more of the salient keywords. In the above searches, the search results comprise a sample of web page content, and the user generally must access and review the entire page to determine other content. It would be useful to preview and obtain additional content that is relevant to the keywords or other search criteria. For example, many 'gallery' style pages contain more than just a single relevant image; so a user may wish to preview all images within a web page that are related to the search keywords. Alternatively, the user may wish to preview more complete portions of text that are related to the search keywords, rather than just the snippet that is generally provided by current search engines. The user may also wish to obtain a copy of those images, text, or other media content without having to access and review a whole web site. It is with respect to these and other issues that the present invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 4 shows a sample web page with images for possible harvesting;

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements. The meaning of "a," "an," and "the" include plural references. The meaning of "in" includes "in" and "on." Additionally, a reference to the singular includes a reference to the plural unless otherwise stated or is inconsistent with the disclosure herein. The term "or" is an inclusive "or" operator, and includes the term "and/or," unless the context clearly dictates otherwise. The phrase "in one embodiment," as used herein does not necessarily refer to the same embodiment, although it may. Similarly, the phrase "in another embodiment," as used herein does not necessarily refer to a different embodiment, although it may. The term "based on" is not exclusive and provides for being based on additional factors not described, unless the context clearly dictates otherwise. The term "user" can include a computer user, an online service subscriber, and/or other person using an electronic device.

Illustrative Operating Environment

Figure 1:
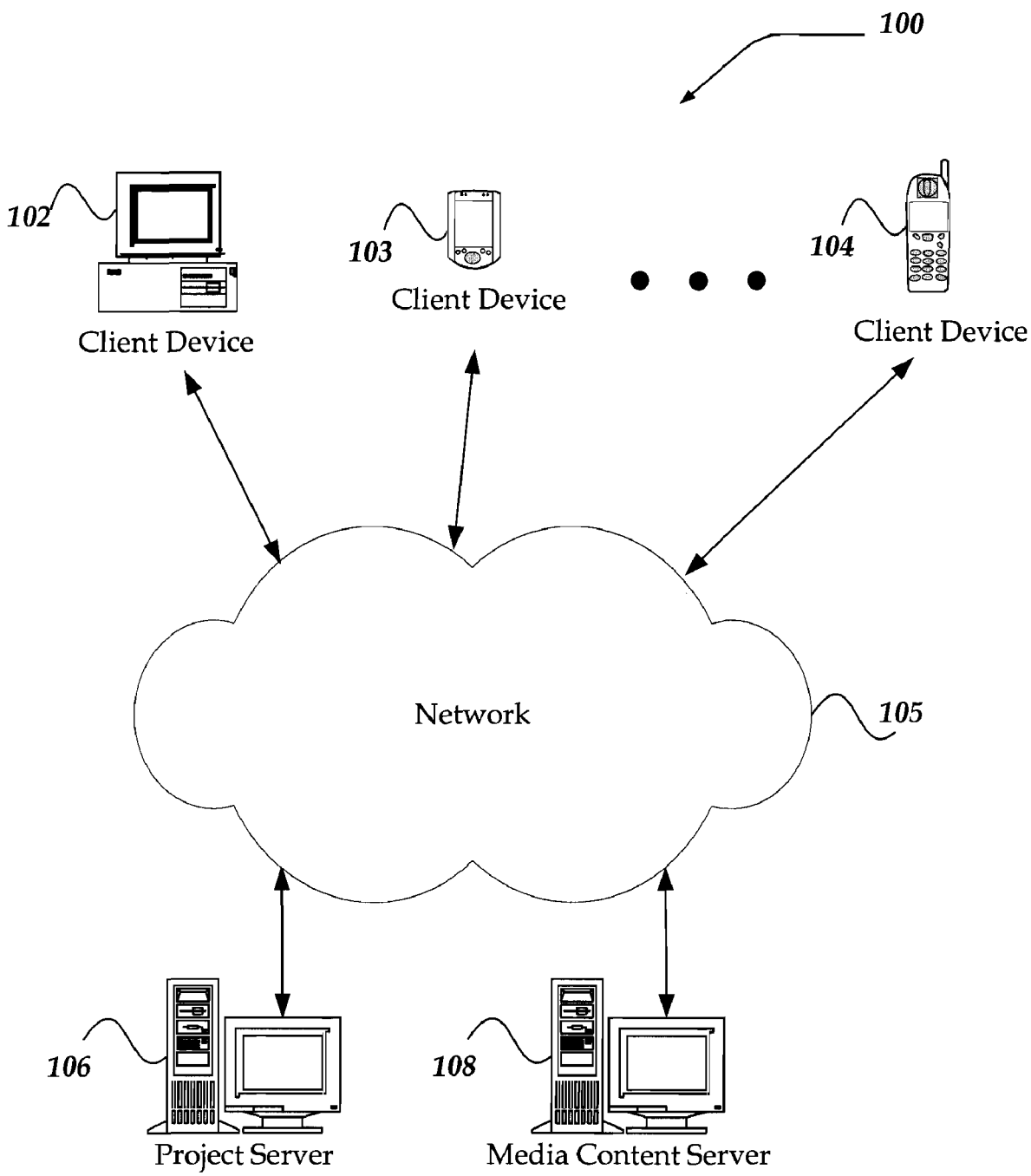
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, a project server 106, and a media content server 108. Network 105 is in communication with and enables communication between each of client devices 102-104, project server 106, and media content server 108.

Client devices 102-104 may include virtually any computing device capable of receiving and sending a message over a network, such as network 105, to and from another computing device, such as media content server 108, each other, and the like. The set of such devices may include devices that typically connect using a wired communications medium such as personal computers, multiprocessor systems, microprocessor-based or programmable consumer electronics, network PCs, and the like. The set of such devices may also include any device that is capable of connecting using a wired or wireless communication medium such as a PDA, POCKET PC, wearable computer, and any other device that is equipped to communicate over a wired and/or wireless communication medium. Similarly, client devices 102-104 may be devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like.

Each client device within client devices 102-104 may include a browser application that is configured to send, receive, and display web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a wireless application protocol (WAP), a Handheld Device Markup Language (HDML), such as Wireless Markup Language (WML), WMLScript, JavaScript, and the like. The browser application may also be configured to interact with an online service, such as an online educational project development service.

Similarly, client devices 102-104 may be configured to include a client application, such as an application that may enable a user to manage an educational project, and the like. The client application may in turn store data at a remote location, such as project server 106, and the like. As such, a client application may be configured to manage various actions on behalf of the client device. For example, the client application may enable a user to interact with the browser application, an email application, and the like, to manage aspects of a project, such as an educational project.

Client devices 102-104 may be further configured to receive a message from another computing device employing one or more other mechanisms, including, but not limited to email, Short Message Service (SMS), Multimedia Message Service (MMS), instant messaging (IM), internet relay chat (IRC), mIRC, Jabber, and the like.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between client devices 102-104, project server 106, and/or media content server 108.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Project server 106 and media content server 108 may comprise multiple computing devices or a single computing device. Project server 106 may provide online services such as project development, management, and/or distribution. Project server 106 may also provide messaging, search, news, shopping, advertising, media content distribution, and/or other services. Media content server 108 generally provides content such as web pages, websites, and the like. Media may include text, graphics, images, videos, audio content, multimedia content, and the like. Media content server 108 may also provide services similar to those of project server 106 and/or other services. Devices that may operate as project server 106 and/or media content server 108 include dedicated servers, personal computers, desktop computers, multiprocessor systems, microprocessor-based or programmable consumer electronics, network PCs, and the like.

Illustrative Server Environment

Figure 2:
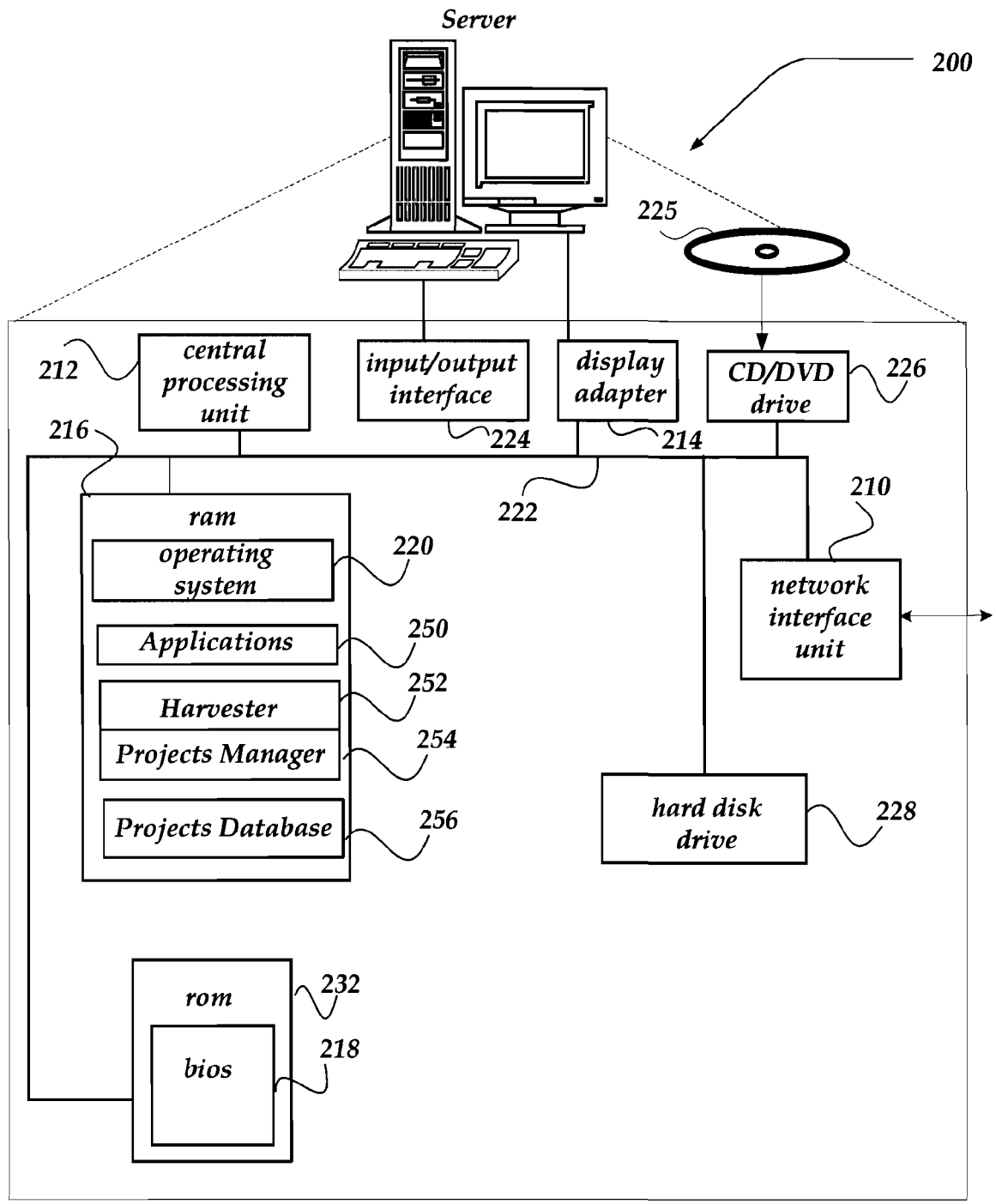
FIG. 2 shows one embodiment of a computing device that may be included in a system implementing the invention.

FIG. 2 shows one embodiment of a computing device, such as a server or a client according to one embodiment of the invention. For one embodiment, the computing device will be described in terms of a server. Server 200 may include many more components than those shown. The components shown, however, are sufficient to disclose an illustrative embodiment for practicing the invention.

Server 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 200. Any general-purpose operating system may be employed. Basic input/output system ("BIOS") 218 is also provided for controlling the low-level operation of server 200. As illustrated in FIG. 2, server 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

The mass memory as described above illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, compact disc (CD), digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, instant messaging programs, schedulers, calendars, web services, transcoders, database programs, word processing programs, spreadsheet programs, and so forth. Other application programs may track a user's online activities with the user's permission. For example, an application program may track the user's portal service behaviors (e.g., web searches, online purchases, interaction with project data, interaction with project developers, etc.) and/or other behaviors.

Mass storage may also include applications such as a harvester 252, which may access and/or evaluate web pages and/or websites to determine, access, and/or gather media objects or other content. Mass storage may further include modules that are useful for managing a user's projects, such as a projects manager module 254 and a projects database 256. Projects manager may include or be coupled to harvester 252 and/or projects database 256. Projects database 256 may include a relational database, a text file, a folder, and the like, that is configured to maintain and store information about one or more projects that the user wishes to use and/or share. Project information may include author data, lesson plans, content resource identifiers, user identifiers, usage data, feedback data, and/or other information. Project information may be entered by one or more users and/or obtained from other sources. The project information may be used only with the projects manager or with other services, such as a portal service, data feed services, and the like. The project information, and modules to control the project information, may be centralized or distributed over a number of resources.

Server 200 also includes input/output interface 224 for communicating with external devices, such as a mouse, keyboard, scanner, or other input devices not shown in FIG. 2. Likewise, server 200 may further include additional mass storage facilities such as CD/DVD drive 226 and hard disk drive 228. CD/DVD drive 226 generally reads or writes data and/or instructions from or to a removable medium 225, such as a CD. Hard disk drive 228 is utilized by server 200 to store, among other things, application programs, content, harvester 252, projects manager 254, projects database 256, and the like.

Illustrative Client User Interface

Figure 3:
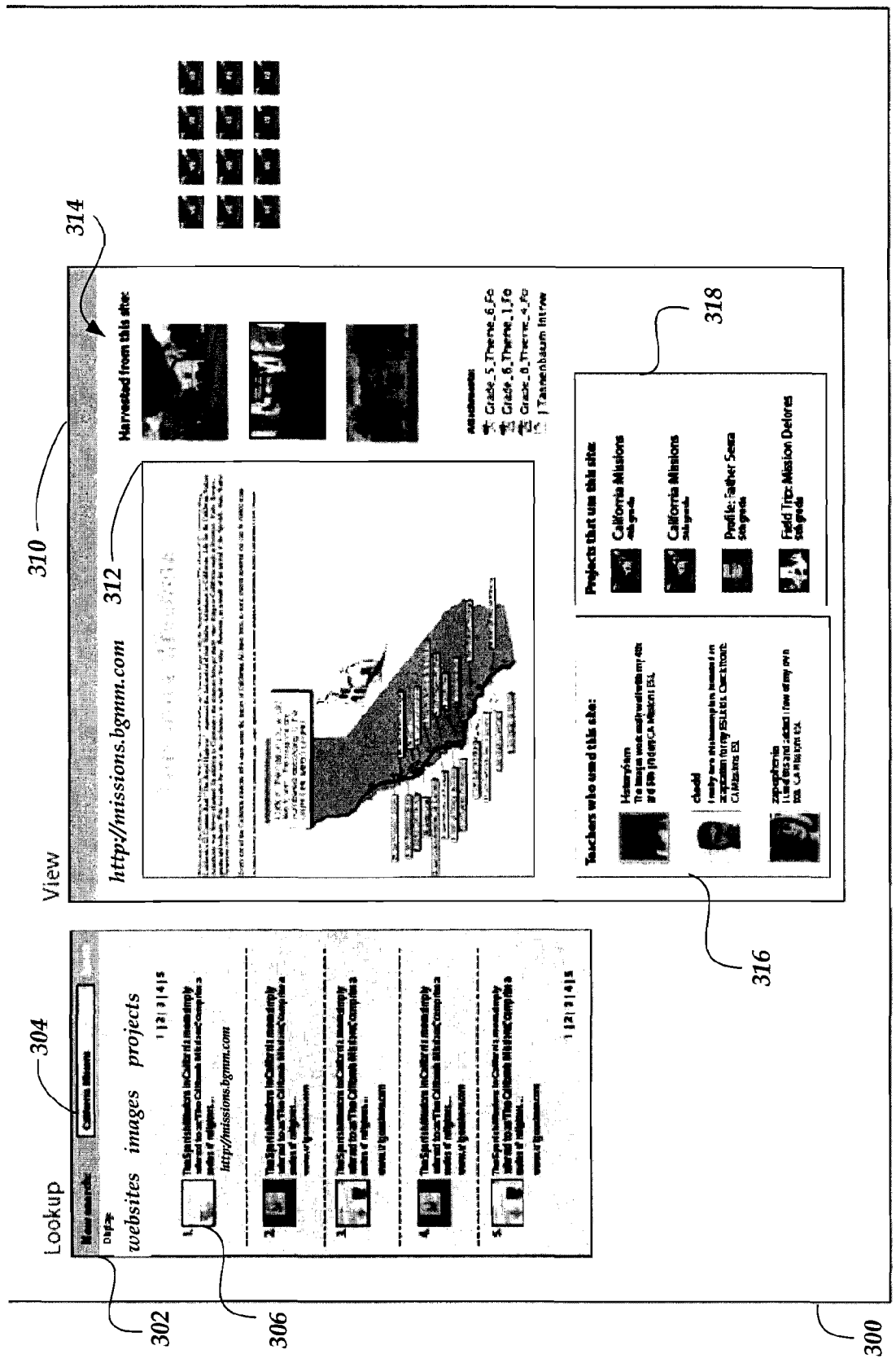
FIG. 3 shows a screen shot of a client user interface, illustrating a sample website preview.

A user interface and operation of certain aspects of an embodiment of the present invention will now be described with respect to FIGS. 3 through 5. FIG. 3 shows a screen shot of a client user interface 300, illustrating a sample website preview for developing educational projects. Client user interface 300 may be embodied in a browser interface, a client application program interface, and/or the like. In this embodiment, client user interface includes a search pane 302. A user may submit a search term, such as "California Missions," through a search field 304. One or more search results, such as a first search result 306, are displayed in search pane 302. The search results may be obtained with an online search engine and/or a local search application program. The search results generally identify organized websites or individual web pages that may link to other web pages. In addition, or alternatively, the results may identify client data found with a local search application program. Result 306 generally identifies a URL for accessing a particular web page of a website that includes the search term. Result 306 also lists a snippet of content from the website. A thumbnail image of the web page is also displayed with result 306 and each of the other search results.

A user may select a search result, such as first search result 306, and the selection is communicated to the project server, which returns preview information displayed in a preview pane 310. In this embodiment, the preview pane includes a primary content display 312. The primary content display generally displays the selected website, web page, initial video frame, or the like. The project server also utilizes the harvester to determine and access medial objects and/or other relevant content from the content associated with the selected search result. This relevant content is referred to herein as harvested content. The harvested content may comprise one or more images, video objects, audio objects, text, and/or other content. The harvester may attempt to use the search term, which was submitted to search for the search results, to determine harvested content from the website and/or related web page. Alternatively, the search term may be submitted separately to the harvester along with an identifier of the selected search result.

The harvester may use the search term to determine relevant content in the selected search result website, associated web page, and/or other related source. Harvested content may be processed by the project server to create thumbnail images, compress the harvested content, perform encryption, or perform other operations before the harvested content is communicated back to the client. The harvested content, thumbnail images, and/or other associated data is displayed as preview harvested content 314. A user can move, copy, or otherwise manipulate the preview harvested content 314 to cause a similar operation on the actual harvested content. For example, a user may drag and drop a preview image to a project identifier to cause the corresponding harvested content and/or any related metadata to be copied to a storage location associated with the project.

In this embodiment, the project server searches the project database for users who have used the selected search result website and/or associated web page in a project. The identified users are communicated back to the client and displayed as a list of content users 316. In this example embodiment, the content users are teachers, who are registered with the online project management service, and who have created an educational project that uses the web page shown in primary content display 312.

Similarly, the project server searches the project database for projects that include the selected search result website and/or associated web page. The identified projects are communicated back to the client and displayed as a list of content-using projects 318. In this example embodiment, the projects are online projects, managed by the project management service, and created by teachers as educational projects that include the website or web page shown in primary content display 312.

FIG. 4 shows a screen shot illustrating a sample web page content 400 that includes images for possible harvesting. The sample web page content may be a separate web page within a website that is the selected search result or includes the selected search result web page of FIG. 3. Alternatively, sample web page content 400 may comprise a separately selected search result web page. The sample web page content includes text 402 that wraps around an embedded image 404. The text includes the search keyword "Mission" near embedded image 404. The harvester may use the proximity of the search keyword to the image as a criterion for harvesting embedded image 404 for preview. Alternatively, the harvester may harvest embedded image 404 simply because it is wrapped by text 402. This is an example of using text density to determine a relevant media object to harvest. Embedded image 404 can be detected within the text as file name "Painter_at-work.JPG," while parsing the source markup code:

<br> The Team began with the conservation of the St. Peregrine Chapel,&nbsp;&nbsp; </a><img alt="painter1" src="Painter_at-work.JPG" style="width: 216px; height: 168px;" align="right"><a name="ant">the small side chapel located on the southeast side of the Serra Chapel.&nbsp; Since then, the St. Peregrine Chapel has been re-roofed, the eroded adobe bricks have been replaced, and the building exterior has been re-plastered.</a></b>

Often, relevant media objects are not embedded in text or not associated with a large amount of text. To identify such objects as relevant, the harvester may evaluate one or more characteristics of the objects. For example, the harvester may determine from the markup code that left image 406 has the same height, width, aspect ratio, and/or other characteristic as a right image 408. Other characteristics may include an amount of identical data between media objects, a proximity of multiple media objects together in a group, a file type of media objects, and the like. Each characteristic can be assigned a weighting factor to indicate a significance of each characteristic for deciding whether to harvest a particular media object and provide it in the preview display.

Some objects may not be considered relevant to preview. For example, graphic 410 is somewhat near text, but is not embedded in text. Graphic 410 is positioned further way from other images on the web page and does not have similar dimensions as other images on the web page. Graphic 410 has a different file type (e.g., GIF) than the other images on the web page (e.g., JPEG). Graphic 410 is positioned uniquely in the web page's Document Object Model. A weighted calculation of these characteristics may result in a value that is less than a threshold value chosen to determine relevance.

Figure 5:
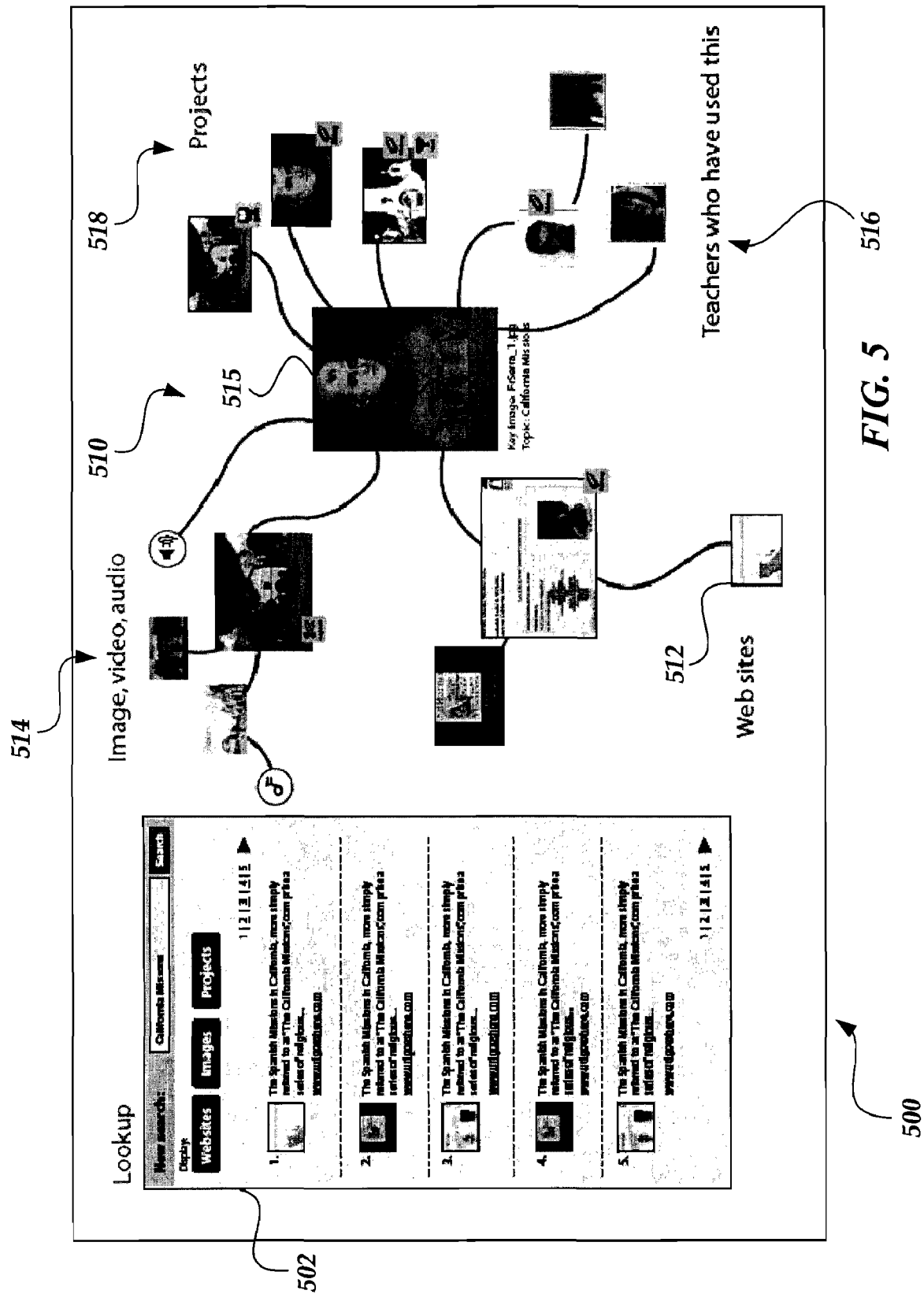
FIG. 5 shows a screen shot of a client user interface, illustrating a sample relationship map for projects and content.

FIG. 5 shows a screen shot of a client user interface 500, illustrating a sample relationship map 510 for projects and content. This example client user interface 500 also includes a search pane 502 for submitting search terms and receiving search results. A user may request, select, or otherwise indicate a data item, such as content item 515, from a web page, from the harvested content, from a project, or from another source. Data items may include content, web pages, projects, users, or the like. An identifier of the selected data item is used to query the projects database and/or other sources to determine relationships between the selected data item and other data items. From the determined relationships, a map is rendered, such as relationship map 510. In this example embodiment, relationship map 510 illustrates relationships between a selected content item 515 and websites 512, other content 514, projects 518, and users 516. Other data items may include metadata, search results, statistical data, and the like.

Illustrative Logic

Figure 6:
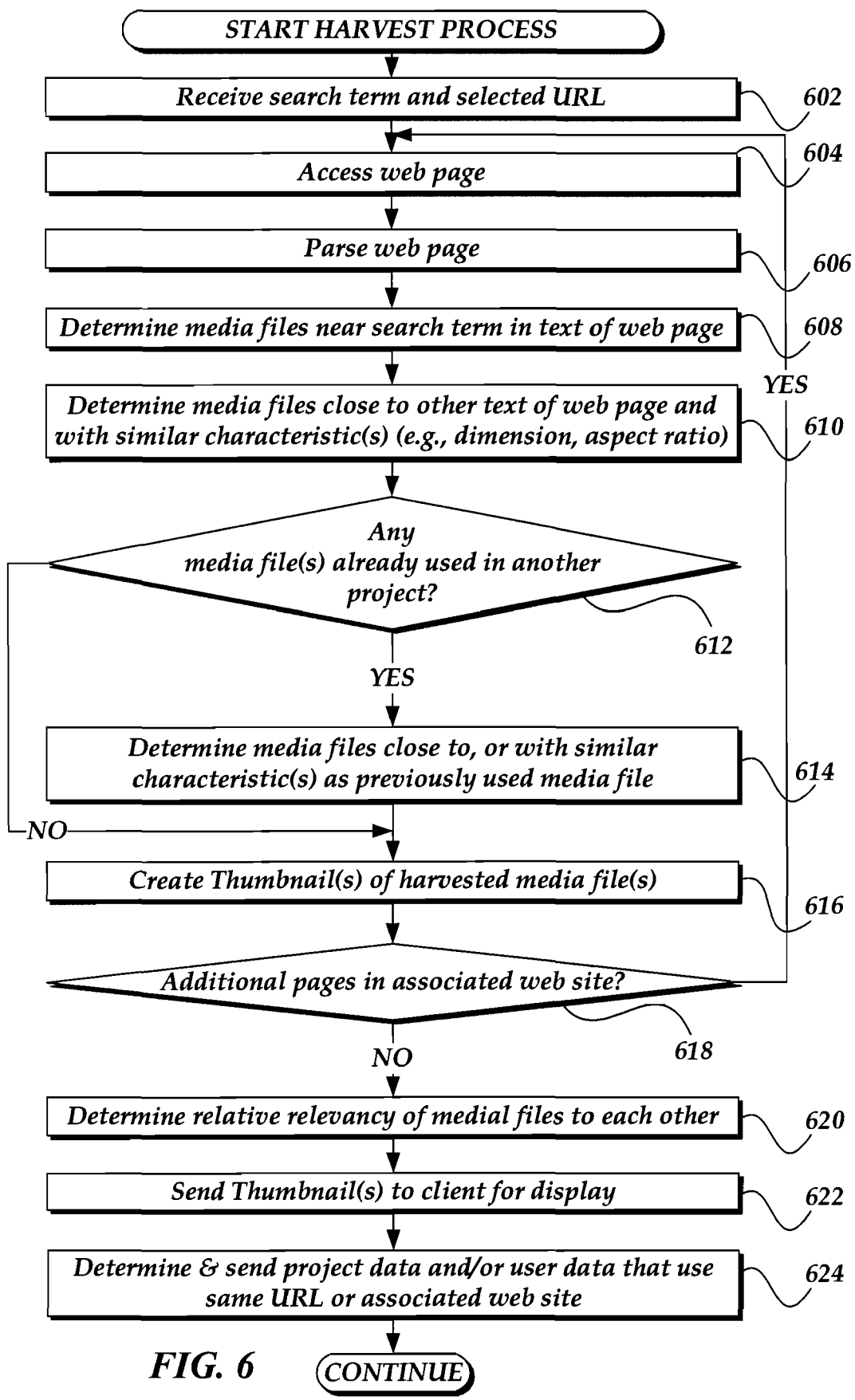
FIG. 6 illustrates an example logical flow diagram generally showing one embodiment of a process for harvesting content.

FIG. 6 illustrates an example logical flow diagram generally showing one embodiment of a process for harvesting content. At an operation 602, the projects server receives a search term from a client device. In this example, the projects server interfaces with a search engine to perform a web search based on submitted search terms. The projects server coordinates return of the search results to the client device for display in the search pane of a projects user interface, such as the one illustrated in FIG. 3. The user of the client selects one of the search results to preview related content. The projects server receives a selected URL associated with the selected search result. At an operation 604, the projects server accesses a web page identified by the URL.

The harvester, or the projects server generally, parses the accessed web page at an operation 606. As described above, the harvester analyzes the source markup code of the accessed web page to identify content objects for preview. In this example, the harvester identifies media objects, such as image files. Other objects may include video files, audio files, applets, text, and the like. The media objects may be incorporated within the web page source markup code or may reference separate files. At an operation 608, the harvester analyzes the markup code to determine whether any media files are near the submitted search term in text of the selected web page. Similarly, the harvester may determine whether any media files are at least partially embedded in text. Any such media files may be given a relatively large weighting factor. The harvester also determines, at an operation 610, whether any media files are close to other larger portions of text, although not necessarily embedded in the text or near a search term. A smaller weighting factor may optionally be applied to these media files. A predefined threshold may determine whether a portion of text is large. In additional, or alternatively, the harvester determines whether the media files near large portions of text share similar characteristics, such as a similar dimension, a similar aspect ratio, and/or other characteristic. Similar media files near a large portion of text may be given a higher weighting factor than a single media file near a large portion of text.

If the above operations do not identify any media files, or to obtain additional media files, the harvester may compare media files with those of other projects. At a decision operation 612, the harvester determines whether any of the media files in the web page are already used in another project. This indicates that a matching media file may be relevant to the search term, but not identified by text near the media item. The harvester generally accesses the projects database to search for the media file name, file metadata, and/or other data. If another project uses one of the media files identified in the current web page, the harvester determines, at an operation 614, any media files that are close to the previously used media file or have similar characteristics as the previously used media file. The harvester may apply a certain weighting factor to the identified media file, even thought it is not necessarily near text. The harvester may apply a higher weighting factor if the previously used media file is also close to, or has similar characteristics as other media files in the web page. If another project does not use a particular media file identified in the current web page, the harvester does not perform operation 614.

At an operation 616, the harvester creates a thumbnail image of each media file identified in the operations above. The harvester determines, at a decision operation 618, whether any additional web pages are available to analyze in a website associated with the current web page. If other web pages are in the website, control returns to operation 604 to access another web page in the website. If no other web pages are in the current website, the harvester ranks, sorts, filters, or otherwise determines a relative relevance of the harvested media files to each other, at an operation 620. At an operation 622, the corresponding thumbnails are sent to the client for preview display with the client user interface.

At an operation 624, the harvester, or other portion of the projects server, determines any projects, users, or other data items that use, or are associated with the website of web pages that were analyzed as described above. For any matching project, a project identifier, icon, and/or other project data is sent to the client for display as a project that uses the selected website. Similarly, for any matching user, a user identifier, thumbnail, and/or other user data is sent to the client for display as a user that uses the selected website. The above data is also used for a relationship map.

If a user wishes to obtain and/or manipulate a harvested object, the user can manipulate the displayed thumbnails, identifiers, and/or other data without having to access the website directly. For example, if the user drags and drops a thumbnail image from the preview pane to a project pane or other screen location, the client submits a corresponding instruction to the projects server. The instruction may be submitted in an http request or other message, and include identifiers of the dragged thumbnail and the project over which the thumbnail was dropped. The projects server receives the instruction at an operation 626, and determines a corresponding action to perform. In this example, the projects server may copy the media file and metadata that is associated with the dragged thumbnail. The copy may be communicated to a database that stores content associated with the project over which the thumbnail was dropped. Any other manipulation or instruction through the client user interface can be reflected in a server operation on the harvested object(s). The user may also use the client user interface to submit data for annotating the harvested object(s) or providing other metadata. Similarly, a client application may automatically generate or submit data to annotating the harvested object(s) or provide other metadata. Other examples of manipulating harvested objects are described in U.S. patent application Ser. No. 11/508,596, filed on Aug. 22, 2006, and titled "Persistent Saving Portal," the entire contents of which are hereby incorporated by reference.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent is:

1. A method for accessing data, comprising:
receiving a request to preview a portion of a web page without requiring rendering the entire web page, wherein the request identifies a website that includes the web page;
automatically accessing the web page;
determining a characteristic of a first media object of the web page;
identifying a second media object of the web page based at least on a determination that the second media object has a substantially the same characteristic as the determined characteristic of the first media object; and
enabling a user to preview at least a portion of the first media object and at least a portion of the second media object.

2. The method of claim 1, further comprising:
receiving an indication that the portion of the first media object was manipulated through a user interface; and
performing an operation with the first media object, wherein the operation is associated with the manipulation.

3. The method of claim 1, wherein the website is identified by a uniform resource locator determined by a search based on a search term.

4. The method of claim 1, wherein the web page is accessible through a link from a different web page of the website identified in the request.

5. The method of claim 1, wherein the characteristic comprises at least one of the following: a dimension, an aspect ratio, a size, a proximity to a text portion of the web page, a proximity to a search term in the web page; and a position in a Document Object Model.

6. The method of claim 1, wherein the first media object comprises one of the following: an image, a video, and an audio content.

7. The method of claim 1, wherein the portion of the first media object comprises one of the following: a thumbnail image of the first media object and a sample of the first media object.

8. The method of claim 1, further comprising providing at least one relationship of the first media object to at least one of the following:
a project that includes the first media object and a user identifier associated with a user who has used the first media object.

9. The method of claim 7, further comprising displaying a map of the at least one relationship.

10. The method of claim 1, further comprising providing a user interface that includes:
a search pane through which a search term can be entered and an identifier of the website can be selected; and
a preview pane that displays the portion of the first media object and the portion of the second media object in a relationship to each other based at least in part on a weighting factor applied to the characteristic.

11. A computer readable medium storing executable instructions that causes a computing device to performing the actions of claim 1.

12. A server for accessing data, comprising:
a communication interface in communication with a network;
a memory for storing instructions; and
a processor in communication with the communication interface and with the memory, wherein the processor performs actions based at least in part on the stored instructions, including:
receiving a request to preview a portion of a web page without requiring rendering the entire web page, wherein the request identifies a website that includes the web page;
automatically accessing the web page;
determining a characteristic of a first media object of the web page;
identifying a second media object of the web page based at least on a determination that the second media object has a substantially the same characteristic as the determined characteristic of the first media object; and enabling a user to preview at least a portion of the first media object and at least a portion of the second media object.

13. The server of claim 12, wherein the processor performs further actions based at least in part on the instructions, including:
receiving an indication that the Portion of the first media object was manipulated through a user interface; and
performing an operation with the first media object, wherein the operation is associated with the manipulation.

14. The server of claim 12, wherein the characteristic comprises at least one of the following: a dimension, an aspect ratio, a size, a proximity to a text portion of the web page, and a proximity to a search term in the web page.

15. The server of claim 12, wherein the processor performs further actions based at least in part on the instructions, including: providing at least one relationship of the first media object to at least one of the following: a project that includes the first media object and a user identifier associated with a user who has used the first media object.

16. A client for accessing data, comprising:
a communication interface in communication with a network;
a display;
a memory for storing instructions; and
a processor in communication with the communication interface, with the display, and with the memory, wherein the processor performs actions based at least in part on the stored instructions, including:
transmitting a request to preview a portion of a web page without requiring rendering the entire web page, wherein the request identifies a website that includes the web page; and
enabling a user to preview at least a portion of a first media object and at least a portion of a second media object, wherein the second media object is identified based at least on a determination that the first media object and the second media object share at least one substantially equivalent characteristic determined upon accessing the web page.

17. The client of claim 16, wherein the processor performs further actions based at least in part on the instructions, including: providing a user interface that includes:
a search pane through which a search term can be entered and an identifier of the website can be selected; and
a preview pane that displays the portion of the first media object and the portion of the second media object.

18. The client of claim 16, further comprising an input device in communication with the processor, and wherein the processor performs further actions based at least in part on the instructions, including
receiving an input through the input device to manipulate the portion of the first media object; and
causing an operation to be performed with the first media object, wherein the operation is associated with the manipulation of the portion of the first media object.

19. The client of claim 16, wherein the processor performs further actions based at least in part on the instructions, including displaying a map of at least one relationship of the first media object to at least one of the following: a project that includes the first media object and a user identifier associated with a user who has used the first media object.

20. The client of claim 16, wherein the client comprises a mobile device.

* * * * *

UNITED STATES PATENT AND TRADEMARK OFFICE
CERTIFICATE OF CORRECTION

PATENT NO. : 7,707,198 B2
APPLICATION NO. : 11/609884
DATED : April 27, 2010
INVENTOR(S) : Weber et al.

Page 1 of 1

It is certified that error appears in the above-identified patent and that said Letters Patent is hereby corrected as shown below:

Column 11, line 7, delete "Portion" and insert -- portion --.

Signed and Sealed this
Twenty-second Day of February, 2011

David J. Kappos
*Director of the United States Patent and Trademark Office*